United States Patent [19]

Wilson, Sr.

[11] 4,388,117

[45] Jun. 14, 1983

[54] PROCESS AND APPARATUS FOR PRODUCING PORTLAND AND OTHER HYDRAULIC CEMENTS

[76] Inventor: Eddie K. Wilson, Sr., 6915 Silver Maple Cove, Memphis, Tenn. 38138

[21] Appl. No.: 285,452

[22] Filed: Jul. 21, 1981

Related U.S. Application Data

[63] Continuation-in-part of Ser. No. 165,500, Jul. 3, 1980, abandoned, which is a continuation-in-part of Ser. No. 947,599, Oct. 2, 1978, Pat. No. 4,213,791, which is a continuation-in-part of Ser. No. 690,510, May 27, 1976, abandoned.

[51] Int. Cl.$^3$ ............................................. C04B 7/02
[52] U.S. Cl. ..................................... 106/100; 432/13
[58] Field of Search ....................... 106/314, 100, 103; 501/115; 432/13

[56] References Cited

U.S. PATENT DOCUMENTS

| | | | |
|---|---|---|---|
| 3,303,037 | 2/1967 | Klein | 106/314 |
| 3,666,515 | 5/1972 | Nakagawa | 106/314 |
| 3,801,345 | 4/1974 | Nakagawa | 106/314 |

FOREIGN PATENT DOCUMENTS

| | | | |
|---|---|---|---|
| 785823 | 5/1968 | Canada | 501/115 |

*Primary Examiner*—James Poer
*Attorney, Agent, or Firm*—Gravely, Lieder & Woodruff

[57] ABSTRACT

A hydraulic cement, such as portland cement, is produced by filling a furnace shell with the desired cement in a powdered condition. By the application of intense heat to the filling a skull is developed that lines an upwardly opening cavity. The heat, which may be supplied by electric arcs, is continued within the skull to maintain a pool of melt that has the same chemical composition as the skull and therefore does not react with the skull. Feed materials are introduced into the melt, and these materials are suitably proportioned to chemically combine within the melt without changing the chemical composition of the melt. The melt is drawn off through a tap hole and cooled to provide the desired cement.

21 Claims, 2 Drawing Figures of 4,388,117

PROCESS AND APPARATUS FOR PRODUCING PORTLAND AND OTHER HYDRAULIC CEMENTS

RELATED APPLICATION

This application is a continuation-in-part of co-pending application, Ser. No. 165,500, of Eddie K. Wilson, Sr., filed July 3, 1980, now abandoned and entitled Process for Producing Portland and Other Hydraulic Cements, which is a continuation-in-part of application Ser. No. 947,599, filed Oct. 2, 1978, now U.S. Pat. No. 4,213,791, which in turn is a continuation-in-part of application Ser. No. 690,510, filed May 27, 1976, now abandoned.

BACKGROUND OF THE INVENTION

1. Field of Invention

This invention relates to portland and other hydraulic cements, and more particularly to a process and apparatus for the making of such cements.

2. Description of the Prior Art

The hydraulic cements represent an important group of cementing materials which are used principally in the construction industry. These cements have the special property of setting and hardening under water. The essential components of the cements are lime (CaO), silica ($SiO_2$) and components derived from them. In the presence of water, these components react to form, ultimately, a hardened product containing hydrated calcium silicate. The hydraulic cements include portland cement as well as high alumina cement, hydraulic lime, and other lesser known cements.

Of all the hydraulic cements, portland cement is by far the most important, for this cement is a major construction material that is utilized in practically all concrete as well as in most of the masonry mortars. The principal components of portland cement are tricalcium silicate ($3CaO.SiO_2$), dicalcium silicate ($2CaO.SiO_2$), and tricalcium aluminate ($3CaO.Al_2O_3$), all of which, when in a ground or powdered condition, will react with water to form a hard, stone-like substance held together with intermeshed crystals. Other compounds, such as magnesium oxide (MgO) and tetracalcium aluminoferrite ($4CaO.Al_2O_3.Fe_2O_3$), which are present in portland cement, do not exhibit any cementitious properties. The exact composition of portland cement is defined in A.S.T.M. Standard Specifications which are accepted by the industry.

Generally speaking, portland cement is currently obtained by finely intergrinding lime and silica containing materials and heating the mixture within a rotary kiln to the point of fusion. Fusion occurs at or about 1290° C., the precise temperature depending upon the chemical composition of the feed materials and the type and amount of fluxes that are present in the mixture. The principal fluxes are alumina ($Al_2O_3$) and iron oxide ($Fe_2O_3$), and these fluxes enable the chemical reactions to occur at relatively lower temperatures. Normally the lime is obtained from natural calcareous deposits such as limestone, marl, and aragonite. Under certain conditions, lime may be derived from industrial by-products such as phospho-gypsum, a pluverulent calcium sulfate which may be obtained from the manufacture of phosphoric acid. The silica and fluxes, on the other hand, are normally derived from natural argillaceous deposits such as clay, shale, and sand.

More specifically, to manufacture portland cement, an argillaceous material and a calcareous material are crushed, mixed, and interground to a find powder, with the proportions of the two materials and the composition of each being maintained within narrow limits. The mixing and intergrinding may be done in the dry condition (the dry process) or it may be done in water (wet process). In either case, the mixture passes into the upper end of a rotary kiln where it is heated eventually to the fusion point. However, before this point, water and carbon dioxide are driven off. As the hottest region is approached, a part of the interground mixture of materials melts and chemical reactions take place between the constituents of the raw mixture. In the course of these reactions new compounds are formed. After passing the hottest region, the compounds fuse and form a clinker. The clinker then is discharged into some form of a cooler. When cool, the clinker is mixed with a carefully controlled quantity of gypsum, and the mixture is ground to a very fine powder. That finely ground powder is the portland cement of commerce.

Rotary kilns vary in length and diameter. They revolve slowly (one turn in every 1 to 2 minutes or more) and, as they are slightly inclined, the charge slowly travels downwardly toward the hot end of the kiln. Being heated from its lower end, a rotary kiln develops its hottest temperatures in a rather narrow zone of the kiln, with the temperature becoming progressively less toward the upper end. At no time does the entire mixture in the rotary kiln, even in the hottest zone, become molten. Special refractories are required, especially for the hot zone at the lower end, and once the kiln is fired it must remain in operation, lest the expensive refractory will be destroyed upon cooling. Attempting to operate a rotary kiln above its normal operating temperature range will result in a high percentage of the feed mixture becoming liquid at one time and running uncontrollably out of the kiln. It will also cause severe damage to the refractories and to the kiln shell.

Generally, a rotary kiln is heated by burning a fossil fuel at its lower end, with the hot combustion gases traveling up the kiln. Heat energy is transferred to the downwardly moving raw feed by direct contact and indirectly by heating the refractory lining. As the raw materials become dried, heated, and partly calcined by the hot gases, some of the finer particles are picked up and transported out of the kiln as kiln dust.

The kiln dust usually contains some alkalies, primarily in the form of compounds of sodium and potassium, for they are usually found in the raw feed and also in coal which is used as a fuel. Also the raw feed and fuel often contain sulfur which volatilizes and enters the gas stream where it usually combines with lime and alkalies for form sulfates. The kiln dust is usually returned to the kiln, but eventually its alkali or sulfate level becomes so great that it is not suitable for manufacturing cement and must be discarded. This presents a disposal problem. Those sulfur compounds that do not combine with alkalies or lime leave with the flue gases. If sulfur is sufficiently high in quantity, the flue gas stream may become environmentally unacceptable and require treatment to meet emission standards.

In short, the present kiln process for manufacturing portland cement requires a large capital investment, and consumes an enormous amount of fuel. Furthermore, the kiln must remain heated, once it is fired, since the thermal shock encountered upon cooling will destroy its refractory which is quite expensive in itself.

SUMMARY OF THE INVENTION

One of the principal objects of the present invention is to produce portland and other hydraulic cements in an electric furnace, thereby eliminating the need for a rotary kiln. Another object is to provide a process of the type stated which can utilize a wide variety of feed materials including, naturally occurring calcareous and argillaceous materials, as well as by-products from industrial processes, irrespective of whether those materials are in a molten or a pulverulent or non-pulverulent solid state. A further object is to provide a process of the type stated, the equipment for which is considerably less expensive than a conventional cement kiln. An additional object is to provide a process of the type stated which can be interrupted to the extent that it is completely shut down without damaging equipment used in the process. Still another object is to provide a furnace in which the process may be practiced. These and other objects and advantages will become apparent hereinafter.

The present invention is embodied in a process including: maintaining a melt within a cavity that is lined with the desired cement, with the melt having substantially the same chemical composition as the desired cement; introducing appropriate feed materials into the cavity with the feed material being proportioned to, upon combining chemically, produce the desired cement; heating the melt within the cavity sufficiently to enable the materials to liquefy and chemically combine within the melt, with the heating being effected by electrical energy; withdrawing the melt from the cavity; and cooling the withdrawn melt to solidify it into a substance that has the chemical constituency and properties of the desired hydraulic cement. The invention also resides in a furnace having a shell, a filling in the shell with the filling having substantially the same chemical composition as the cement, a skull in the filling, and means for producing sufficient heat within the skull to maintain a melt having the chemical composition of the desired cement. The invention also consists in the process steps, the parts, and the arrangements and combinations hereinafter described and claimed.

DESCRIPTION OF THE DRAWINGS

In the accompanying drawings which form a part of the specification and wherein like numerals and letters refer to like parts wherever they occur.

DETAILED DESCRIPTION

Figure 1:
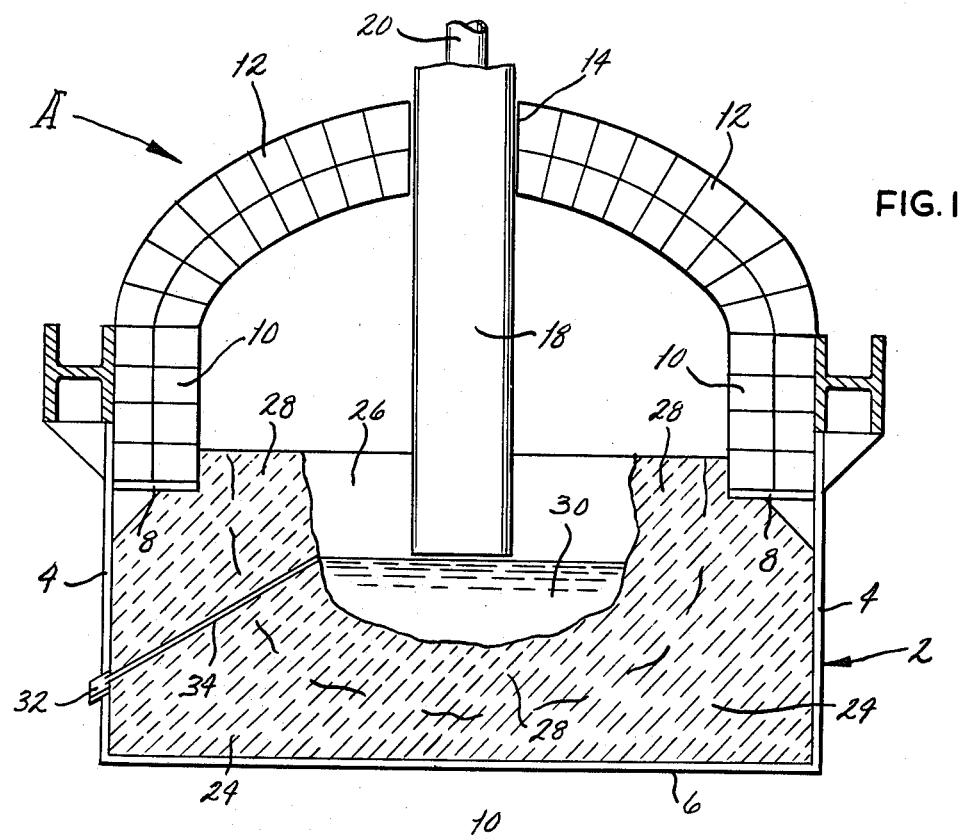
FIG. 1 is a sectional view in elevation of a furnace constructed in accordance with and embodying the present invention.

The process of the present invention involves introducing raw feed materials that contain compounds necessary for the production of portland or other hydraulic cements into a melt in proper proportions. Within the melt the compounds react with each other and with the melt, all such that the melt acquires the chemical constituency necessary for portland cement or whatever hydraulic cement that is desired. The melt is contained within an electric furnace which supplies enough heat to the melt to maintain it in a molten condition and at least at the temperature at which the chemical reactions occur. However, the melt is self-lining in that it forms its own skull that serves as a refractory for protecting the furnace shell. The furnace further produces turbulence by thermal currents within the melt to effect necessary mixing of the feed materials. The furnace is tapped either intermittently or continuously to withdraw the portion of the melt that has acquired the chemistry of the desired cement, and this withdrawn portion is permitted to solidify.

Since portland cement is by far the most significant of all the hydraulic cements, the process will be described as it applies to the production of portland cement, but it should be recognized that by varying raw materials and proportions, other hydraulic cements may be produced.

Once the melt and skull are established in the furnace, the raw feed materials are added to the surface of the melt in the proper proportions. Those raw materials may be molten or solid, and when in the solid form, they may be pulverulent or nodular. Also, they may be at ambient temperature, or they may be pre-heated or even pre-calcined. When nodular, the practical upper size limit is determined by design so that the nodules will not interfere with the operation of the furnace and its feed equipment. In this regard, the melt reaches high temperatures so that all materials introduced into it eventually reach a molten state.

One of the raw feed materials should include a source of lime, that is calcium oxide (CaO), and perhaps the most common source of lime is limestone which contains primarily calcium carbonate ($CaCO_3$). When heated to about 900° C., this compound decomposes into lime (CaO) and carbon dioxide ($CO_2$), the latter of which, being a gas, normally escapes. Usually, the limestone is preheated prior to its introduction into the furnace, not only to drive off the carbon dioxide, but to also place lesser electrical energy demands on the furnace as well. While limestone is quite common, other naturally occurring calcareous materials also contain high quantities of calcium carbonate and are equally suitable for use as a raw feed material in the process. Such materials may be aragonite, chalk, marl, cement rock, or marine shells. Normally, naturally occurring calcareous materials are crushed to a nodular form for use in the process, but any fines produced in the crushing operation are likewise suitable as a feed material and are introduced into the melt along with the nodules, preferably after undergoing preheating and calcining so that lime is essentially the feed material that is introduced.

Even the by-products of certain industrial processes are suitable for use as the source of lime. For example, certain tailings from flue gas scrubbers contain a considerable amount of lime. Also suitable is kiln dust, which is normally collected from conventional cement kilns, and is high in alkali and sulfur content. Phospho-gypsum, or naturally occurring gypsum, which is essentially calcium sulfate ($CaSO_4$), may also be used as a source of the lime, but suitable means for disposing of the sulfur trioxide ($SO_3$) gas should be available, e.g. sulfuric acid or elemental sulfur production.

The raw feed materials should also include a source of silica ($SiO_2$), and an excellent source for silica is certain naturally occurring argillaceous materials such as clay, shale, slate, and sand. These materials, of course, are solids and are easily reduced to fines or nodules, if not already in that state. They may be introduced into the melt as such, whether at ambient temperature or preferably preheated. Certain fly ash and also coal ashes have a high proportion of silica, and may likewise be introduced into the melt as is or preheated.

Another excellent source of both lime and silica is calcium silicate ($CaO.SiO_2$) which is found in slag derived from many industrial processes. For example, the blast furnaces used in producing steel produce a large amount of slag. The same is true of certain processes used to extract phosphorus from calcium phosphate rocks and other processes used to smelt chromium ore. The slag is, of course, initially in a molten state, and as such is usually poured out to produce a slag heap which grows larger and larger. Heretofore, little use has been found for the slag, and as a consequence it merely accumulates. The slag may be broken up into a granular or nodular consistency and introduced as such into the melt within the furnace.

The energy requirements of the cement making process may be reduced substantially if the slag is introduced into the electric furnace in its initially molten condition. This, of course, requires locating the cement making facility in close proximity to the industrial process from which the slag is derived. In this regard, calcium silicate melts at about 1300° C. and a considerable amount of heat is required to elevate it to that temperature.

The raw feed materials, in addition to including a source of lime and a source of silica, may also include a source of alumina, that is aluminum oxide ($Al_2O_3$), although the amount of alumina that is useful is considerably less than the amount of lime or silica. Silica and alumina are often found together in nature as well as in the slag-type by-products of many industrial processes, so more often than not the source of silica will likewise serve as the source of alumina.

Finally, the feed materials may contain a flux to lower the temperature at which the desired chemical reactions will occur within the melt of the furnace. To a measure, the alumina functions as a flux. Another common flux is iron oxide ($Fe_2O_3$), which like alumina is found in many argillaceous substances as well as slag-type industrial by-products.

Other materials often appear in minor quantities in the various feed materials. These include compounds of the alkalies, sodium and potassium, and of sulfur, titanium, magnesium, manganese, phosphorus, barium, and strontium. If present in excessive quantities, they may be harmful to the cement product. This is particularly true of the alkali and phosphorus compounds.

Within the melt of the electric furnace the feed materials combine chemically so that the melt when withdrawn and cooled will have adequate proportions of tricalcium silicate ($3CaO.SiO_2$), dicalcium silicate ($2CaO.SiO_2$) and tricalcium aluminate ($3CaO.Al_2O_3$), and whatever other compounds are necessary for the desired cement. In this regard, the chemical constituency of the feed materials must be known and the feed materials must be proportioned such that the melt within the electric furnace acquires the chemistry necessary for the desired portland or other cements. Normally, the proportioning is achieved by passing the feed materials over scales and weighing them before they are introduced into the furnace. Although the feed materials may contain compounds in addition to the lime, silica, and alumina, many of these evolve as gases during preheating or under the intense heat of the furnace. For example, when calcium carbonate ($CaCO_3$) is the source of lime, the carbonate is driven off in the form of carbon dioxide ($CO_2$), leaving lime ($CaO$). The electric furnace is particularly effective in volatilizing alkali compounds and phosphorus compounds in the feed materials because of the concentrated high heat in the melt, usually leaving only trace amounts of these compounds in the final product and these amounts are acceptable. Other non-cementitious compounds may also appear as merely traces in the final product and they do not significantly affect its ability to serve as a cement. Free lime should be maintained at a minimum and within specifications.

Not only does the electrical energy supply heat to the melt and thereby maintain it at a temperature sufficient for the chemical reactions to occur, but it further mixes the melt by thermal currents to insure that the feed materials are thoroughly mixed in the melt. Indeed, the turbulence produced provides all of the mixing that is necessary to effect the necessary chemical reactions between the various raw materials, even when those raw materials are introduced into the melt separately and at different locations over the surface of the melt.

The electric furnace will generate thermal currents within the melt, and perhaps of the various types of electric furnaces that are available, electric arc furnaces are the most suitable. In an electric arc furnace, the melt is maintained in a molten state by energy supplied to it through electrodes that project downwardly toward, but do not normally contact the upper surface of the melt. Indeed, the melt, as opposed to the surrounding skull, is a relatively good conductor of electricity and serves to conduct an electrical current between electrodes. To this end, the electrodes, which may be arranged in a triangular or an in-line pattern, are positioned above the melt such that an arc will span the space between the lower end of each electrode and the upper surface of the melt when an electric potential of sufficient magnitude is applied across the electrodes. As a consequence, a current flows between the electrodes, the path of that current being through the arcs and the molten material in the region between the arcs. The melt, while being a conductor is also a resistor, and it is the flow of the electricity through this resistor coupled with the presence of the arc that generates the temperature which is sufficiently high to maintain the melt substantially above the temperature of incipient fusion for the feed materials. Electric plasma furnaces that employ plasma arc flames are also suitable, as are electric induction furnaces.

Any solidified materials which are introduced to the melt become molten even when they are essentially in a nodular state. They further combine chemically with the other components, so that the melt becomes homogeneous in character. The homogeneous melt possesses the chemical constituency which provides the desired portland or other cement when the homogeneous melt is allowed to cool. In fact, it is the unique capability of the electric furnace to respond quickly to variations in individual feed materials that permits a level of chemical quality control that cannot even remotely be attained in the conventional rotary kiln, where considerable time elapses between feeding and formation and testing of the clinker. In this regard, the formation of cementitious compounds are controlled by monitoring the electrical resistance of the melt.

Actually, the melt is contained within a skull that surrounds the melt and is formed from the same material as the melt itself. The skull serves as the actual refractory lining for the furnace. Thus, the melt and skull, being formed from the same material, will not react with each other, and the melt is therefore not in any way contaminated by the refractory lining. In this regard, conventional refractory brick contains magnesium and other elements which if introduced into the melt would detract from the quality of the cement that is produced. The melt in view of its extremely high temperature, which may approach 1650° C., but is usually nearer 1500° C., depending on the feed materials, would almost certainly react with conventional refractory materials if it were allowed to contact those materials. The result would be an erosion of the refractory materials and a contamination of the melt.

The skulling is achieved by packing the furnace shell with portland cement or whatever other cement is desired from the process. This cement is in a pulverulent condition and as such conforms to the shape of the shell. However, it is a poor conductor of electricity and will not conduct sufficiently to bring an electric arc furnace into operation. To start the furnace, assuming that it is of the electric arc variety, a conductor such as a carbon bar is placed between the electrodes. When the electrical potential is impressed across the electrodes, the temperature of the bar elevates sufficiently to melt the powdered cement in its vicinity. The molten cement then becomes the conductor and the carbon bar is removed. As an alternative, the flame of a plasma torch may be directed into the region between the electrodes to melt the powdered cement and thereby form a pool. Then the electrical potential is impressed across the electrodes. The current of course will then flow through the pool and sustain it.

In any event, once the pool is established and sustained, the melt is gradually withdrawn from it to create the skull that lines the packed cement. This withdrawal is effected by lancing the packed cement and the skull and allowing the molten material to drain from the pool. The skull is initially made somewhat larger than the size at which operation is desired. Then the electrical power is reduced which permits the skull to harden somewhat around the cavity in which the pool is maintained. Thereafter the cavity is back filled somewhat with properly proportioned feed materials, which react within the original melt that is in the skull to create more melt. The size of the skull and the melt within it depends on the electrical energy supplied to the furnace and the amount of feed material fed into the pool, and can be varied within limits.

Not only does the skulling avoid the erosion and contamination problems that would result from the formation of the melt against conventional refractory materials, but it further eliminates the start up and shutdown problems associated with conventional refractories. In this regard, once the refractory lining of a conventional cement kiln is brought up to the operating temperature for the kiln, the kiln cannot be cooled down without the risk of losing the refractory lining, for conventional refractory materials will not withstand the thermal shock that accompanies cooling from the extremely high temperatures required for the production of portland cement.

If one or more of the feed materials are pulverulent, it will be necessary to control the feed rate to prevent a massive heat sink forming in the melt because of the fine particle sizes involved.

Whenever the chemical constituency of the feed materials is such that excessive amounts of unvaporized alkalies, sulfates, or phosphates are present, the furnace is equipped with a roof and an exhaust system so that those gases evolving from the melt can be collected. Products such as alkalie oxides or sulfates can be condensed into a solid and recovered. Excess sulfur compounds can be absorbed by other compounds for recovery or disposal simultaneously. This removes any environmentally unacceptable materials from the evolved gases before they are vented to the atmosphere.

It is within the region of the homogeneous melt that the furnace is tapped, and the melt which is withdrawn in a controlled manner and is allowed to cool into a clinker. The clinker then passes to a cooler where its temperature is reduced in the conventional manner. The cooling must be rapid enough to prevent the dicalcium silicate in the beta phase from changing to the gamma phase. The latter crumbles or "dusts" and is not cementitious.

The heat that is extracted from the clinker at the cooler may be transferred to the preheater where it serves to preheat the feed materials that pass through the preheater. This is best achieved by directing heated air discharged from the cooler into the preheater. Or, it may be used as preheated combustion air if a fossil fuel energy source is used to preheat the feed materials.

The clinker upon leaving the cooler is either shipped to a purchaser or stored. Ultimately the clinker is crushed and ground to a fine powder which is suitable for use as cement.

Figure 2:
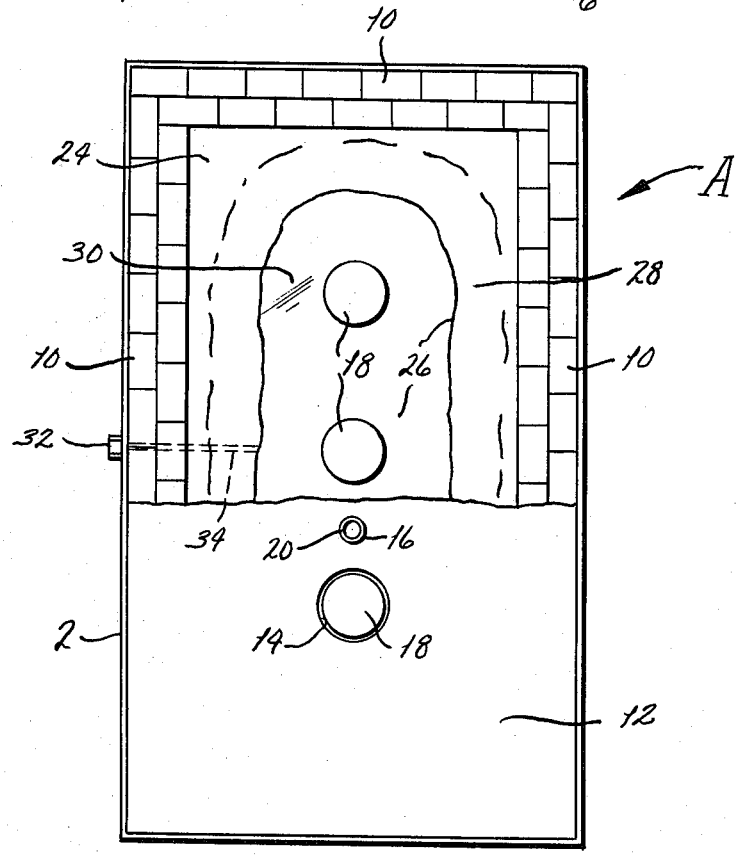
FIG. 2 is a top view, partially broken away, of the furnace.

An electric furnace A (FIGS. 1 and 2) that is suitable for producing cement in accordance with the invention includes a shell 2 which is fabricated from steel plate, the thickness of which depends to a large measure on the size of the furnace. The shell 2 has side walls 4 and a bottom wall 6. Along its side walls 4, the shell 2 is fitted with steel lintels 8 which project inwardly from the side walls 6 and may be reinforced with gussets. Actually, the shell 2 need not be rectangular, but it can also be circular or otherwise curved.

The lintels 8 serve as a support for a refractory wall 10 which lines the upper portions of the side walls 4 and is preferably formed from refractory brick arranged in two or more courses so that the thickness of the refractory wall 10 is about 18 inches. At the upper margin of the shell 2, the refractory wall 10 merges into a roof 12 which is likewise formed from refractory brick, only the brick is laid into an arch instead of in tiers. Refractories composed essentially of magnesium oxide, aluminum oxide, zirconia, to name a few, are suitable refractory materials for the bricks of the wall 10 and roof 12, since the melt never comes into contact with the refractory wall 10 or roof 12. The roof 12 has electrode openings 14 and feed openings 16, all arranged in a row along its center, with the latter being interposed between the former. The electrode openings 14 have carbon electrodes 18 directed downwardly through them, while the feed openings 16 have cast iron or refractory lined feed pipes 20 leading to them.

The shell 2 of the furnace holds a filling 24 that is for the most part powdered cement having the same chemical composition as that which is desired from the furnace. The upper surfaces of the filling 24 is located generally midway between the top and the bottom of the refractory wall 10, and opening out of this surface is a cavity 26 that is lined with a skull 28. Actually, the skull 28, while being formed from the same material as the powdered portion of the filling 24, is fused together into a truly solid and rigid structure. As such, it is ideally suited for holding a pool 30 of melt, which has the same chemical composition as the skull 28 and the remainder of the filling 24, for it will not react with the melt. The upper surface of the pool 30 is significantly lower than the upper surface of the filing 24 and its skull 28. Indeed, the surface of the pool 30 should be about 60 inches below the upper surface of the filling 24 for efficient operation and for protection of the roof 12 and upper portion of the wall 10. It should further be below the lower end of the wall 10.

The electrodes 18 project into the cavity 26 to within about one inch of the surface of the pool 30. The melt is a relatively good conductor of electricity, and the electrical potential that is impressed across the electrodes 18 causes electrical current to pass through the air gaps between the ends of the electrodes 18 and the surface of the pool 30 and to further flow through the melt within the pool 30. Indeed, arcs from the ends of the electrodes 18 span the short space between them and the upper surface of the pool 30. These arcs serve to heat the melt within the pool 30, and further introduce substantial turbulence into it. Also, the melt, while being an electrical conductor, nevertheless does have some resistance and functions much like a resistant-type heater when the large current passes through it. Thus, the melt of the pool 30 is heated both by the arcs and passage of current through the melt itself. The electrodes 18 may be arranged other than in a line. For example, they may be in a triangular pattern or in a circle.

In the region of the cavity 26 the skull 28 is somewhat plastic due to the intense heat and high temperature within the cavity 26. Indeed, the temperature of the melt along the surface of the cavity 26 may be as high as 1650° C. The skull 28 becomes more rigid away from cavity 26, and for a distance of about 18 inches it is in essence solidified melt. Beyond this region, the filling 24 has a powdered consistency, although the granules of the powder tend to be fused together. In the region of the shell 2, the filling 24 is at about 100° C. to 200° C. Thus, the filling 24 and its skull 28 serve as an excellent insulator for protecting the shell 2 from the intense heat within the cavity 26.

The melt that forms the pool 30 never contacts anything but the skull 28, and therefore cannot combine with the constituents of the refractory brick in that portion of the wall 10 located at a higher elevation than the top of the pool 30, which would result in significant erosion of the wall 10. On the contrary, the melt remains only in contact with the skull 28 which, being of the same chemical composition as the melt, does not react with the melt. Consequently, the melt is not contaminated by constituents of the refractory brick in the wall 10 and roof 12.

While the wall 10 does not contact the melt of the pool 30, it does protect the side walls 4 of the shell 2 from heat that is radiated from the arcs within the cavity 26 of the skull 28. Even so, neither the refractory wall 10 nor the refractory roof 12 are elevated to the temperatures experienced by the refractory of a conventional rotary kiln at its burning zone. In this regard the wall 10 and roof 12 cool to lower temperatures slowly without experiencing the immediate destructive effects of thermal shock as occur with rotary kilns upon cooling.

One of the side walls 4 on the shell 2 contains a tap 32 and extending through the filling 24 and skull 28 between the tap 32 and the cavity 30 is a tap hole 34 through which that portion of the melt having the chemical constituency of the desired cement is withdrawn. The hole 34 opens into the cavity 26 at the upper surface of the pool 30, and functions as a wier for permitting continuous tapping of the pool 30. It should also open into the pool 30 at a region where the chemical reactions between the various feed materials have been completed. This is usually one of the hotter regions of the pool 30. The tap hole 34 may be established by advancing an oxygen lance or a plasma gun through the filling 24 from the tap 32.

In order to maintain the depth and size of the pool 30, and the cavity 26 as well, relatively constant, more feed material is introduced into the cavity 26 to replenish the melt that is withdrawn. This material is delivered to the feed openings 16 through the pipes 20 and is allowed to drop downwardly into the pool 30 where it melts and chemically reacts to maintain the chemistry of the pool at that of the desired cement, at least at the location of the tap hole 34.

The shell 2, as well as the refractory wall 10 and roof 12 are constructed using conventional furnace building techniques. Similarly, the electrodes 18 are conventional as is the mechanism for raising and lowering them, and they are connected to a source of electrical energy in the usual manner.

To prepare the furnace A for operation, its shell 2 is filled with powdered cement of the type to be obtained from the process. In most instances this will be portland cement. The powdered cement is tamped from time to time as the shell 2 is filled, and enough cement is provided to raise the level of the tamped cement to an elevation above the lower end of the refractory wall 10. This provides the filling 24 which initially is of a pulverulent consistency throughout and has an uninterrupted upper surface.

Once the filling 24 is in place and fully tamped, the portion of it between the electrodes 18 is heated sufficiently to render it molten so that it will lose its dielectric characteristic and become conductive. Various procedures are available for achieving this end. For example, conductive bars may be placed over the upper surface of the tamped filling 24 and beneath the ends of the electrodes 18. The bars should not only conduct electricity relatively well, but should further have a melting temperature substantially higher than that of the cement. Once the bars are in position the electrodes 18 are lowered into contact with them. Then the electrical potential is placed across the electrodes 18. The current flows through the bars which become resistance type heaters, reaching a temperature exceeding that of the melting temperature for the cement of the filling 24. As a consequence, the cement in the region of the bars melts and forms a shallow pool at the upper surface of the filling 24. The bars are then pushed away from the ends of the electrodes 18 and pulled from the pool that is formed. When the bars clear the electrodes 18, arcs establish between the electrodes 18 and the pool, and the melt of the pool thereafter serves as the conductor through which the electrical current passes between the electrodes 18.

Another procedure for establishing the shallow pool is to direct the flame of a plasma torch at the upper surface of the tamped filling 24 in the region between the electrodes 18. A plasma torch is a device through which a gas is directed and discharged. The device sets up powerful magnetic fields in the gas flow and this ionizes the gas, enabling it to conduct electricity. Indeed, a high electrical potential is impressed across the gas. As a result the gas upon being discharged carries a flame that is of extremely high temperature—hot enough to melt the cement filling 24. While many gases are available for use in plasma torches, it is desirable to choose one that will not react with the cement filling 24. Suitable gases are carbon dioxide, oxygen, nitrogen, argon, and helium to name a few. The flame of the plasma torch is adjusted to impinge on the filling 24 in the region between two electrodes 18 so as to melt the filling 24 in that region and create a shallow pool of melt between the two electrodes 18. Once the pool is established, the electrical potential is impressed across the electrodes 18. As a result, arcs develop between the shallow pool and the ends of the electrodes 18 and the pool conducts the electrical current between the electrodes.

Irrespective of how the shallow pool is formed, once the arcs are established and the current passes through the melt of the pool, sufficient electrical energy is applied to enlarge the pool, both in terms of surface area and depth. However, the pool is never allowed to grow to the extent that it reaches the refractory wall 10 or shell 2. On the contrary, its periphery is always kept away from the wall 10. Of course, the portion of the filling 24 surrounding the pool will be somewhat plastic and further outwardly will have a fused, although somewhat more rigid consistency. Beyond the fused area the filling 24 will remain in a pulverulent condition. The plastic and fused regions constitute a skull for holding the pool.

When the shallow pool is the desired size, which is about the size required for the upper end of the cavity 26, the pool is tapped by inserting an oxygen lance or plasma gun into the tap 32 of the shell 2 and advancing it through the pulverulent filling 24 and the skull surrounding the shallow pool. This drains the pool and creates a shallow cavity. As the pool drains, the electrodes 18 are lowered into the shallow cavity to maintain the arcs between the melt at the top of the pool and the electrodes.

Since the arcs remain, the pool re-establishes itself deeper in the filling 24, leaving the shallow cavity with a greater depth. Then the re-established pool is drained in the same manner and the electrodes 18 are lowered still further.

The foregoing procedure is repeated until the cavity is the size that is desired for the cavity 26 and indeed it is the cavity 26. Due to the intense heat within the cavity 26, the skull 28 which lines it is plastic for a short distance and then becomes more rigid. Even so the rigid portion is fused. The plastic and fused portions together have a thickness of perhaps as much as 18 inches. Beyond the rigid portion is the pulverulent portion of the filling 24, which in time tends to fuse somewhat.

Once the cavity 26 is established at the desired depth, the pool 30 is maintained at a depth that will vary according to the chemical constituency of the melt. The arcs from the electrodes continuously mix the melt of the pool 30. Thereafter appropriate feed materials are introduced into the pool 30 by directing them through the feed openings 16 in the roof 12. The feed materials are introduced in proportions adequate for combining chemically into portland cement or whatever cement is desired from the process. Indeed, the feed materials in the pool 30 react and combine in the presence of the high temperature and the churning such that the pool 30 at the tap hole 34 has the chemical constituency of the desired cement which is the same as that for the skull 28. The pool 30 is tapped continuously through the tap hole 34 which may be the last drain hole used in the formation of the cavity 26.

By controlling the electrical energy supplied to the electrodes 18 as the cavity 26 is developed within the filling 24, the size of the cavity 26 can be controlled. Indeed, it is desirable to form the shallow pools oversize, as the cavity 26 is developed, that is larger than the final pool 30, and then reduce the electrical power once the final pool 30 is established at the correct depth. As the power is reduced, the filling 24 surrounding the pool solidifies, at least in its outer regions, forming the skull 28 which has the same chemical composition as the melt within the pool 30.

The skull 28 and surrounding portion of the filling 24 to a large measure protects the nearby shell 2 from the intense heat radiated from the arcs. However, being of the same chemical composition as the melt, the skull 28 will not react with the melt in the pool 30. This is certainly more desirable than maintaining the melt directly against a refractory wall where it, under the high temperatures, will react with certain refractory elements such as magnesium and become contaminated by those elements.

The furnace A may be shut down merely by turning the electrical power down or off or by withdrawing the electrodes 18 from the pool 30 to terminate the arcs. As long as the pool 30 remains, the furnace A may be restarted by merely lowering the electrodes 18 until the arcs are again established. If the pool 30 solidifies, then its surface must be remelted, such as with a plasma gun, before the arcs will develop. Thus, the furnace A may be used during normal working hours and then shut down. Restarting at the beginning of another work day requires only a short start up time. Since the refractory wall 10 and roof 12 are always maintained at temperatures below those at which the refractory of a conventional cement kiln is operated, they do not upon shut down experience extreme thermal shock of sufficient magnitude to damage them.

Whenever a cement of a different composition is desired, the volume of the pool 30 is enlarged and the composition of the melt within the pool 30 is modified by changing the feed materials. Then, when the chemistry of the melt within the pool 30 is modified as desired, the power is again reduced to form a skull 28 having the same chemical composition as the melt.

In lieu of using the electrodes 18 and the arcs that they produce for heating the melt, a series of plasma gas "guns" may be used for that purpose. The guns would be mounted such that the flames produced by them would impinge against the surface of the melt.

This invention is intended to cover all changes and modifications of the example of the invention herein chosen for purposes of the disclosure which do not constitute departures from the spirit and scope of the invention.

What is claimed is:

1. A process for producing a hydraulic cement, such as portland cement, said process comprising: maintaining a melt within a cavity that is lined with a material having substantially the same chemical composition as the desired cement, the melt also having substantially the same chemical composition as the desired cement, whereby the melt does not react with the material that lines the cavity; introducing appropriate feed materials into the melt within the cavity with the feed materials containing compounds suitably proportioned for the desired cement; heating the melt within the cavity sufficiently to enable the feed materials to be in a molten condition and to chemically combine within the melt, the heating being effected by electrical energy; withdrawing the melt from the cavity; and cooling the withdrawn melt to solidify it into a solid substance that has the chemical constituency and properties of the desired cement.

2. The process according to claim 1 wherein the feed materials are introduced into the melt at the surface of the melt.

3. The process according to claim 1 wherein at least one of the feed materials is a solid.

4. The process according to claim 3 wherein the solid feed material contains a lime-yielding substance.

5. The process according to claim 2 wherein at least one of the feed materials is in a molten state.

6. The process according to claim 5 wherein the molten feed material contains calcium silicate.

7. The process according to claim 1 wherein the heating is effected by producing an electric arc between the upper surface of the melt and electrodes and conducting an electrical current through the melt.

8. A process for producing a cement, said process comprising: placing a filling of cement that is in a powdered condition in a shell; heating the filling at the upper surface thereof sufficiently to create a shallow pool of melt that is surrounded by a solid nonpulverulent skull; draining the pool to produce a cavity that is lined by the skull in the filling; maintaining the pool at the bottom of the cavity in the skull by heating the melt of the pool; introducing feed materials into the melt with the feed materials containing compounds proportioned such that they react and chemically combine within the melt without substantially changing the chemical composition of the melt, whereby the melt does not react chemically with the skull; and withdrawing some of the melt from the pool.

9. The process according to claim 8 wherein the melt is withdrawn from the pool in the skull by forming a hole in the skull and the surrounding filling and allowing the melt to drain from the pool in the skull.

10. The process according to claim 9 wherein the hole is formed in the filling by impinging a concentrated high temperature flame against the filling.

11. The process according to claim 8 wherein the melt in the pool at the bottom of the skull is heated by establishing arcs between electrodes and the upper surface of the melt and conducting electrical current through the melt of the pool such that it passes between the arcs.

12. The process according to claim 8 wherein the filling is placed directly against the shell.

13. The process according to claim 12 wherein the skull forms a cavity that is deep enough to completely surround the arcs.

14. The process according to claim 8 wherein the pool in the cavity is drained a plurality of times so that the cavity and skull become progressively larger before the pool is maintained at the bottom of the cavity in the skull.

15. The process according to claim 1 wherein the step of withdrawing the melt includes creating a tap hole in the material that lines the cavity and allowing the melt to flow through the tap hole.

16. The process according to claim 1 wherein the material that lines the cavity is in a fused condition adjacent to the cavity and in an unfused condition remote from the cavity.

17. The process according to claim 16 wherein the unfused portion of the material that lines the cavity is granular.

18. The process according to claim 1 wherein the step of heating the melt comprises producing a flame that impinges on the upper surface of the melt and imparts turbulence to the melt.

19. The process according to claim 8 wherein the step of heating the filling at the upper surface thereof includes impinging a high temperature flame against the upper surface of the filling and maintaining the flame until a pool develops.

20. The process according to claim 8 wherein the step of heating the filling at the upper surface thereof includes passing an electrical current through a conductive member that rests on the upper surface of the filling and extends between two electrodes, maintaining the conductive member on the upper surface until the filling at the upper surface melts and creates the pool, removing the conductive member, and establishing electric arcs between the upper surface of the pool and the electrodes and passing electric current through the pool.

21. The process according to claim 8 wherein the step of heating the melt of the pool comprises producing a flame that impinges on the upper surface of the melt in the pool and imparts turbulence to the melt.

* * * * *